J. REESE.
Nut Machine.
No. 10,493.
2 Sheets—Sheet 1.
Patented Feb. 7, 1854.
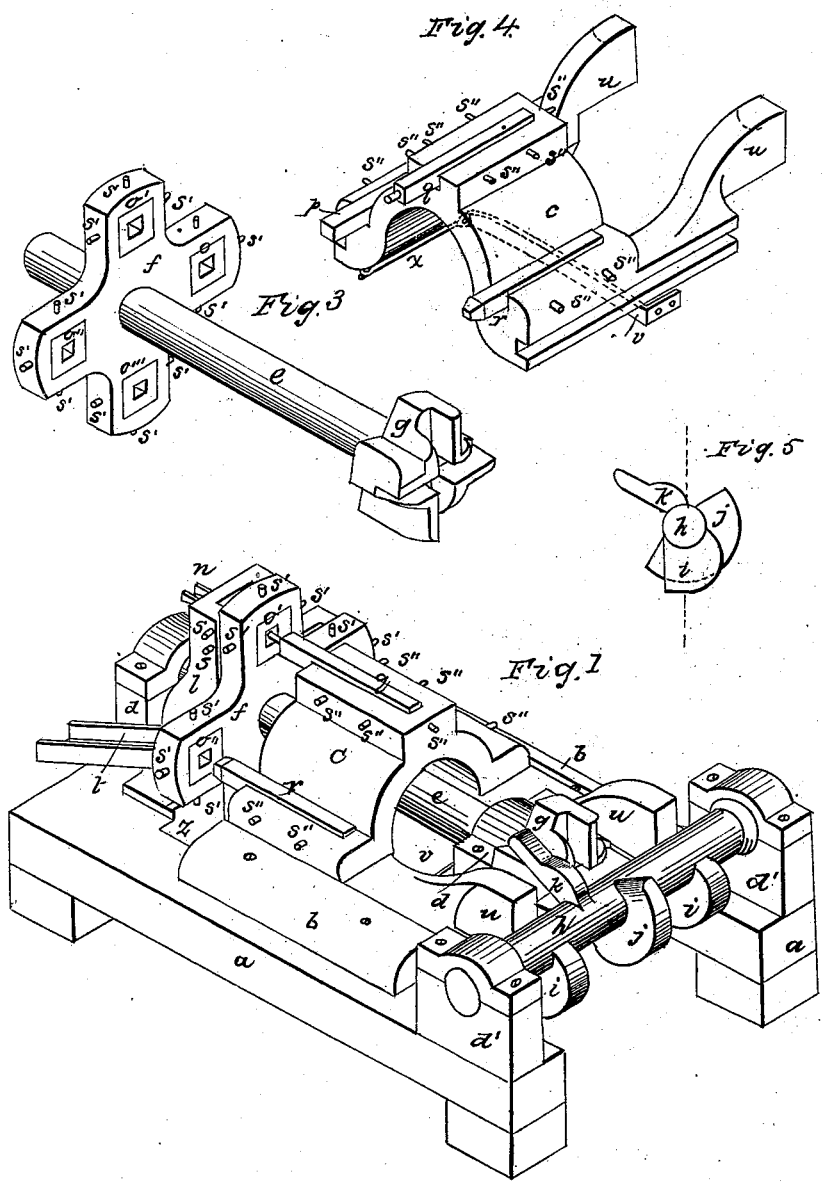

J. REESE.
Nut Machine.
No. 10,493.
2 Sheets—Sheet 2.
Patented Feb. 7, 1854.
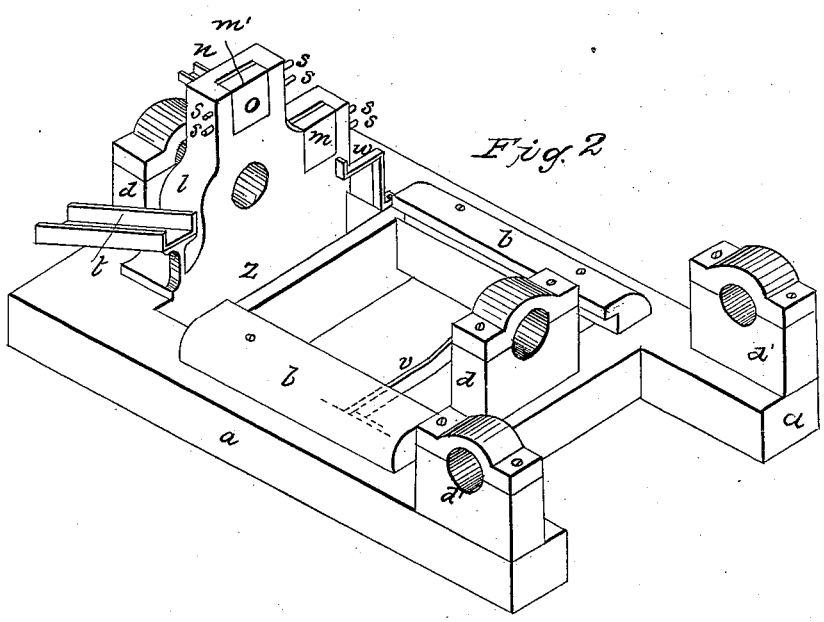

UNITED STATES PATENT OFFICE.

JACOB REESE, OF SHARON, PENNSYLVANIA.

MACHINE FOR MAKING NUTS.

Specification of Letters Patent No. 10,493, dated February 7, 1854.

*To all whom it may concern:*

Be it known that I, JACOB REESE, of Sharon, in the county of Mercer and State of Pennsylvania, have invented a new and useful Improvement in Machines for Making Nuts; and I do hereby declare that the following is a full and exact description thereof, reference being had to the annexed drawings, forming part of this specification, wherein—

Figure 1 is a perspective view of my machine. Fig. 2 is a perspective view of the frame work of my machine, the sliding punch frame, the rotating mold or die box, the guide head and the shaft which carries the cams and guide being removed to exhibit more clearly the construction of the other parts of my machine. Fig. 3 is a perspective view of the main shaft carrying at one extremity the rotating mold box and at the other the guide head. Fig. 4 is a similar view of the sliding punch frame seen in a different position from that in which it is placed in Fig. 1, and Fig. 5 is a sectional view of the working shaft exhibiting the shape and relative position of the cams, lever and guide.

The nature of my invention will better appear after stating the difficulties in the nut machines as ordinarily constructed and the mode in which my machine is designed to obviate or remove them. The operations to be performed by a nut machine are first cutting out a piece of iron of the required size; second, punching a hole in the center of the nut, and lastly in delivering the nut from the machine. In ordinary machines each of these operations are separately performed on one nut before another is commenced while in my machine three nuts are in the machine at once, each undergoing a different operation and in different stages of progress, thus effecting a saving of at least half the time.

In the machines now in use the finished nuts and the "punchings" or bits of iron punched out of the center of the nut fall out in the same place as the finished nut, but in my machine they fall separately and in different places; and my machine obviates the objection to using chilled cast iron dies or molds that they crack and get chipped at the edges, by reason of their becoming too much heated and requiring to be suddenly cooled, by causing one of the dies regularly to pass through water on every revolution of the shaft so that they can never become overheated.

In the drawings Figs. 1 and 2 $a$, $a$, is the frame work of my machine.

$b$, $b$, are guides in which the sliding punch frame $c$ moves backward and forward, in a horizontal plane.

The uprights or journal blocks $d$, $d$, support the main shaft $e$, one end of which supports the rotating mold box $b$, and the other extremity carries the guide head $g$ (see Fig. 3). The uprights or journal blocks $d'$ $d'$ support the working shaft $h$ which is furnished with the cams $i$, $i$, the guide $j$ and the lever $k$. Motion is communicated to the machine by power applied to this working shaft $h$. The upright piece $l$ through which also passes the main shaft $e$, is furnished with two plates or blocks of steel $m$, $m'$, which are kept in place and the position of which is regulated by the set screws $s$, $s$, &c. The plate $m'$ has a circular hole in its center which is so adjusted as to come exactly opposite to the mold or die in which the hole is punched in the nut, so that the punchings may pass through and out of the machine by the spout $n$. The rotating mold box $f$ is a cruciform frame, the extremity of each arm of which is furnished with a mold or die $o$ $o'$, &c. These molds $o$, $o'$, $o''$, $o'''$, are all made of chilled cast iron and are each of the size of the nut required to be made. They are placed equidistant from the center of the main shaft $e$, so that the center of each mold revolves in exactly the same circle. The exact position of each mold is regulated by set screws $s'$ $s'$ &c. The shape of this rotating mold box $f$ is not material; it may be constructed as a wheel, or in any other way so that the four molds are at uniform distance apart on its circumference and equidistant from the center of motion.

The sliding punch frame $c$ (see Figs. 1 and 4) of the shape shown in the drawing is confined to its seat on the frame by the guides $b$, $b$. It carries three punches $p$, $q$ and $r$. By the punch $p$, the nut is forced into one of the molds or dies in the rotating mold box, being cut out or separated from the bar of heated iron out of which it is made, by the punch $q$, the round hole is made in the nut, and by the punch $r$ the finished nut is delivered or pushed out of its mold into a trough $t$ suitably placed to receive it. These punches $p$, $q$ and $r$, are so placed as to work into three of the molds or dies in the rotating mold box *f*, being nicely adjusted by the set screws *s″ s″ s″*. The sliding punch frame *c*, is furnished with two arms *u u*, which project toward the front of the machine, so far as to rest against the working shaft *h* when the sliding punch frame *c* is drawn back far enough to clear the punches *p q* and *r* from the molds *o, o′, o″*.

When the machine is in operation the sliding punch frame *c* is pushed forward once in every revolution of the working shaft *p* by the cams *i i*, which are of similar shape and are adjusted on the shaft *h* to work in the same manner, and with equal pressure against the end of the arms *u, u*, of the sliding punch frame *c*. These cams *i, i* are of such a shape (see Fig. 5) that after the punches are pressed into the molds the pressure of the cams suddenly ceases, and the sliding punch frame *c*, with its punches is drawn quickly back toward the shaft *h* by means of the spring *v* (see Figs. 2 and 4) one end of which is attached to the frame work of the machine and the other end is connected by a chain or rods *x* to the under part of the sliding punch frame *c*.

The guide head *g* is attached to the front end of the main shaft *e*, and is of a peculiar shape as shown in Fig. 3. The shape is nearly cruciform. On its face are two slits which intersect each other at a point in a line with the center of the shaft *e*. These slits are placed so as to be parallel with the arms of the rotating mold box *f*, that is, in the same vertical and horizontal planes, the object of the guide head *g* and guide *j* and lever *k* being to cause the rotating mold box *f* to turn exactly one fourth ($\frac{1}{4}$) around for each complete revolution of the working shaft *h*, and likewise to hold the rotating mold box *f* steadily fixed at the termination of each complete quarter revolution, and release it again so soon as the next one fourth revolution is to be commenced. This is thus effected. In the position of the several parts shown in Fig. 1, the lower extremity of the guide *j* (the shape of which is that of a segment of a circle of the requisite thickness to pass easily but not loosely through that slit in the guide head *g* which happens to be in a vertical position) is just about to leave the slit in the guide head, at a point concealed from view by the shaft *h* and the lever *k*. So soon as the guide *j* is entirely released from the slit in the guide head *g*, the lever *k* which has now turned so far as to come in contact with one of the arms of the guide head *g* begins to press it down and thus turns the guide head *g* and with it the shaft *e* round. In turning around, the projecting edge of the slit, which was lately in a vertical position, touches the punch or shoulder on the lever *k*, and thus prevents the guide head *g* being turned too rapidly and with a jerking motion. So soon as the slit in the guide head which was vertical, has assumed a horizontal position by the completion of the revolution of the guide head *g*, the other slit has become vertical and at that moment the uper edge of the guide *j*, commences to enter the vertical slit. So long as the guide *j* is in the guide head *g* it is manifest that the guide head *g* cannot turn at all but is kept steadily in its position, during the remainder of the revolution of the shaft *h*. Thus each complete revolution of the shaft *h* causes the shaft *e* and with it the rotating mold box *f* to turn one fourth around and to continue steadily in that position until the sliding punch frame *c* has been forced forward and drawn back, when another revolution of the shaft *h* commencing, the same operation is repeated.

The standard *w*, (see Fig. 2,) is a support whereon the bar of heated iron is placed immediately in front of the mold *o* in which the nut is shaped.

I will now proceed to describe the operation of my machine. Suppose the molds *o* and *o″* to be in a horizontal position and the molds *o′* and *o‴* vertical, the mold *o‴* being concealed in the water-cistern *z*. In this state of the machine the guide is about to enter the slit in the guide head *y* the lever *k* being thrown back. Now a bar of iron at a red heat is placed on the rest *w* in front of the mold *o*. The working shaft *h* turning around brings the cams *i″, i′*, against the ends of the projecting arms *u, u*. The cams push forward the sliding punch frame *c* until the punches *p q* and *s* enter the molds *o o′* and *o″*. The punch *p* (see Fig. 4, being concealed from view in Fig. 1,) cuts out the nut, pressing it into shape against the steel plate or back piece *m*. The cams then release the sliding punch frame *c*, which is brought back by the springs *v* against the circumference of the working shaft *h*. During all this time in which the shaft *h* has made a half revolution, the guide *j* has been passing through the slit in the guide head, and now as soon as the cams are released and the sliding punch frame is sprung back the lever *k* moves the rotating mold box *f* one fourth around by means of the guide head *g* as before described, bringing the mold *o* into the position formerly occupied by the mold *o′*. The guide then again enters the guide heads *g* and the sliding punch frame *c* is again pushed forward by the cams *i, i′*, the punch *q* making the hole through the center of the nut, the "punching" passing out at the spout *n* and at the same time the punch *p*, cuts out and shapes another nut in the mold *o‴*, which is brought opposite to it by the revolution of the rotating mold box *f*. At the next revolution of the working shaft *h*, causes another one fourth revolution of the main shaft *e* and rotating mold box *f*, the finished nut in the mold *o* is pushed by the punch *s* out of its mold into the trough *t*, from which it passes into any receptacle placed to receive the nuts. The fourth revolution of the working shaft *h* which completes the whole revolution of the working shaft *h*, causes empty mold *o*, into a trough of water *z* immediately under the rotating mold box, in which the mold is cooled. Thus during every revolution of the working shaft *h* one nut is cut out and pressed by the punch *p*, another has the hole punched through it, and a third is delivered from the machine in a finished state, and at the same time the mold which is to come into operation on the next revolution of the working shaft *h* is cooled in the cistern. Thus each time a mold is used it is passed through water before it is again brought into use and that without stopping the machine at all, or exposing the nuts themselves to the action of water.

What I claim as my invention and desire to secure by Letters Patent is—

1. The use of the trough of cold water in combination with the rotating die box, for the purpose of cooling each die or mold after it has discharged its nut; and preventing the water from coming in contact with other parts of the machine or with the nuts which are made in it.

2. I do not claim the rotating of the mold box, but I do claim the use of the guide head *g*, constructed as hereinbefore described in combination with the lever *k*, and guide *j*, for the purpose of communicating to the rotating mold box the peculiar motion required, consisting of a succession of sudden yet steady quarter revolutions, each followed by a pause or rest, during which the mold box is held firmly in its place in the manner hereinbefore described.

JACOB REESE.

Signed in presence of—
N. BUCKMASTER,
B. B. CAMPFIELD.